United States Patent
Reynolds et al.

[11] Patent Number: 5,985,475
[45] Date of Patent: Nov. 16, 1999

[54] MEMBRANE FOR SELECTIVE TRANSPORT OF OXYGEN OVER WATER VAPOR AND METAL-AIR ELECTROCHEMICAL CELL INCLUDING SAID MEMBRANE

[75] Inventors: Thomas Alan Reynolds; Daniel John Brose, both of Bend, Oreg.; Milton Neal Golovin, Marietta, Ga.

[73] Assignee: AER Energy Resources, Inc., Smyrna, Ga.

[21] Appl. No.: 08/877,145

[22] Filed: Jun. 17, 1997

[51] Int. Cl.⁶ .......................... H01M 2/12; H01M 12/06; B32B 27/00

[52] U.S. Cl. .............................. 429/27; 429/86; 428/422; 428/524

[58] Field of Search .................. 428/413, 422, 428/524; 429/27, 86

[56] References Cited

U.S. PATENT DOCUMENTS

| | | | |
|---|---|---|---|
| 2,468,430 | 4/1949 | Derksen et al. | 136/173 |
| 2,759,038 | 8/1956 | Marsal | 136/136 |
| 3,359,705 | 12/1967 | Mullhaupt | 55/16 |
| 3,509,694 | 5/1970 | Imai et al. | 55/16 |
| 3,692,569 | 9/1972 | Grot . | |
| 3,853,629 | 12/1974 | Elliott | 136/111 |
| 3,884,722 | 5/1975 | Tucholski | 136/102 |
| 3,977,901 | 8/1976 | Buzzelli | 136/86 |
| 4,105,830 | 8/1978 | Kordesch | 429/27 |
| 4,118,544 | 10/1978 | Przybyla et al. | 429/27 |
| 4,189,526 | 2/1980 | Cretzmeyer et al. | 429/13 |
| 4,262,062 | 4/1981 | Zatsky | 429/27 |
| 4,421,579 | 12/1983 | Covitch et al. | 156/60 |
| 4,470,859 | 9/1984 | Benezra et al. | 429/254 X |
| 4,483,694 | 11/1984 | Takamura et al. | 55/158 |
| 4,503,132 | 3/1985 | Struthers | 429/40 |
| 4,599,157 | 7/1986 | Suzuki et al. | 204/192 |
| 4,741,744 | 5/1988 | Wu et al. | 55/16 |
| 4,808,651 | 2/1989 | Blickle et al. | 524/366 |
| 4,917,793 | 4/1990 | Pitt et al. | 428/315.9 X |
| 4,957,826 | 9/1990 | Cheiky | 429/27 |
| 5,066,403 | 11/1991 | Dutta et al. | 210/638 |
| 5,242,763 | 9/1993 | Konishi et al. | 429/27 |
| 5,258,202 | 11/1993 | Pellegrino et al. | 427/235 |
| 5,306,579 | 4/1994 | Shepard, Jr. et al. | 429/40 |
| 5,328,777 | 7/1994 | Bentz et al. | 429/27 |
| 5,356,729 | 10/1994 | Pedicini | 429/27 |
| 5,362,577 | 11/1994 | Pedicini | 429/27 |
| 5,447,636 | 9/1995 | Banerjee | 210/638 |
| 5,462,586 | 10/1995 | Sugiyama et al. | 96/13 |
| 5,506,067 | 4/1996 | Tinker | 429/27 |
| 5,569,551 | 10/1996 | Pedicini et al. | 429/27 |
| 5,630,941 | 5/1997 | Burger et al. | 428/315.7 X |
| 5,658,669 | 8/1997 | Althoff et al. | 428/421 |
| 5,707,757 | 1/1998 | Lee | 429/86 |

FOREIGN PATENT DOCUMENTS

| | | |
|---|---|---|
| 0 615 779 | 9/1994 | European Pat. Off. . |
| 0 649 675 | 4/1995 | European Pat. Off. . |
| 58-092449 | 6/1983 | Japan . |
| 60-220122 | 11/1985 | Japan . |
| 63-310622 | 12/1988 | Japan . |
| 4002067 | 1/1992 | Japan . |
| 4188575 | 7/1992 | Japan . |
| 4312771 | 11/1992 | Japan . |
| 5198318 | 8/1993 | Japan . |
| 5062687 | 12/1993 | Japan . |
| 7105991 | 4/1995 | Japan . |
| 9097605 | 4/1997 | Japan . |

OTHER PUBLICATIONS

Henry, B., Teltech® Literature Search Service, *Uses of Fomblin Perfluoroether Compounds*, Jan. 31, 1997, pp. 1–193.

*Primary Examiner*—Stephen Kalafut
*Attorney, Agent, or Firm*—Jones & Askew, LLP

[57] ABSTRACT

A permeable membrane comprising a gas permeable substrate film and a layer of a polymeric perfluoro compound on the substrate exhibits selective transport of oxygen over water vapor and a metal-air electrochemical cell comprising such a membrane has enhanced control over its water content. Suitable polymeric perfluoro compounds include perfluoropolyalkylene oxides such as polyperfluoropropylene oxide or polyperfluoropropylene oxide co-perfluoroformaldehyde. The polymeric perfluoro compound layer is desirably crosslinked to form a thin layer on the substrate film or to form a self-supporting membrane. A suitable substrate film is a microporous polymer membrane.

75 Claims, 2 Drawing Sheets

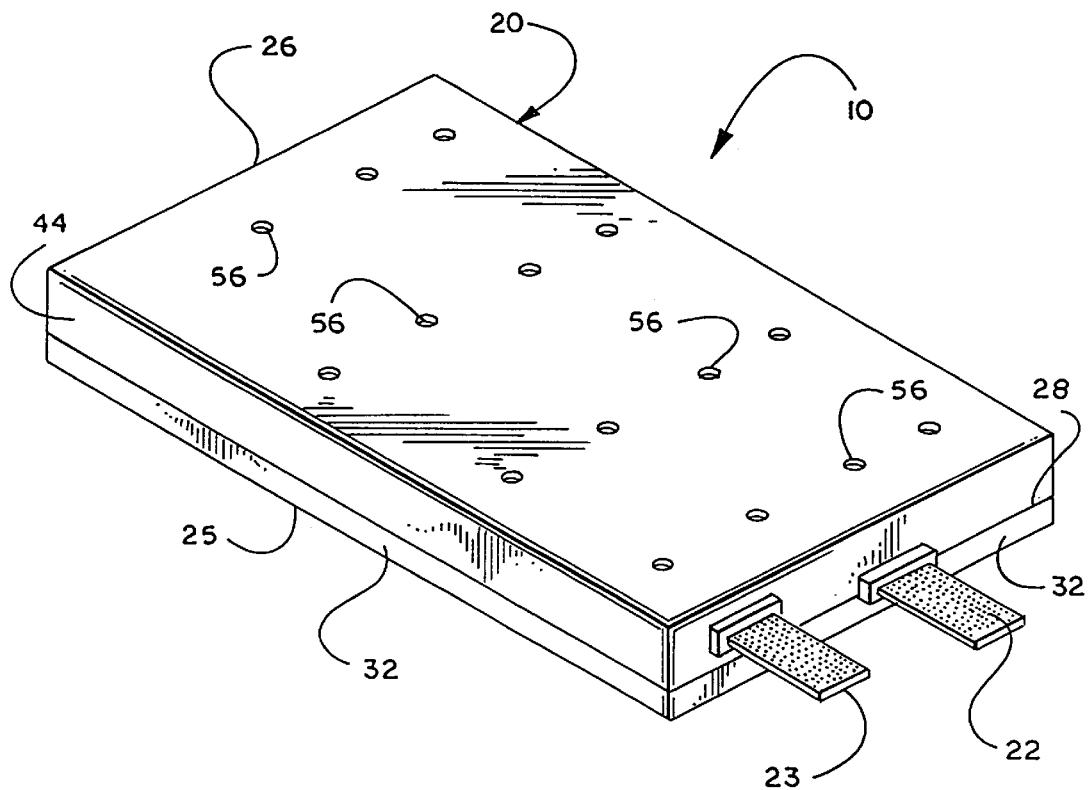
Fig_1

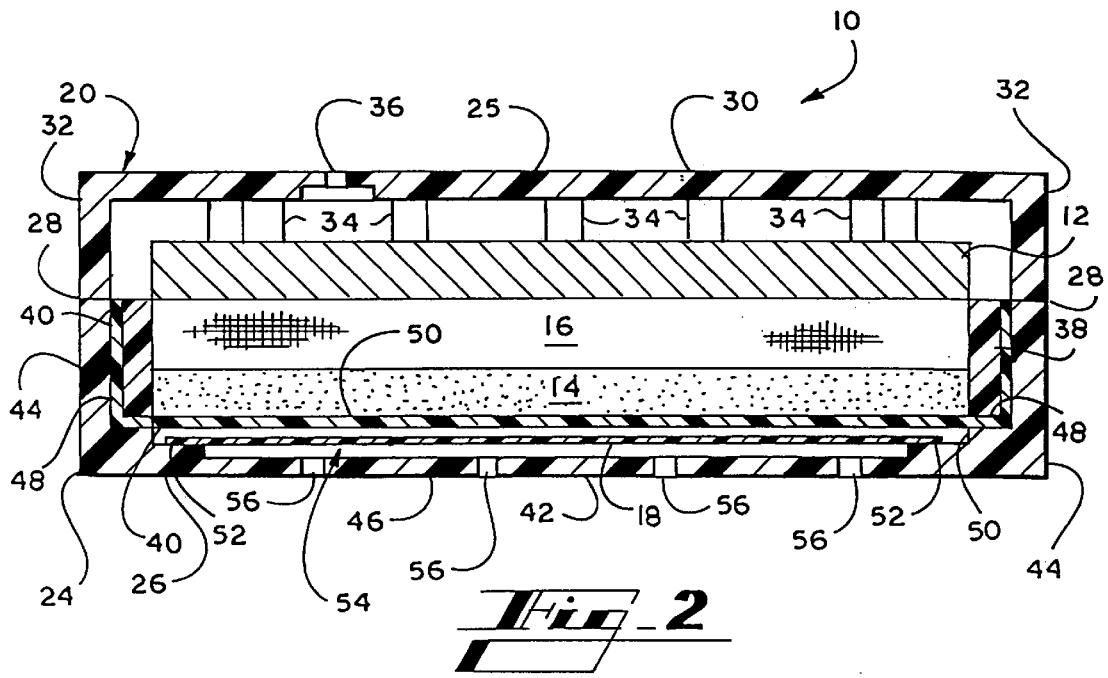
Fig_2
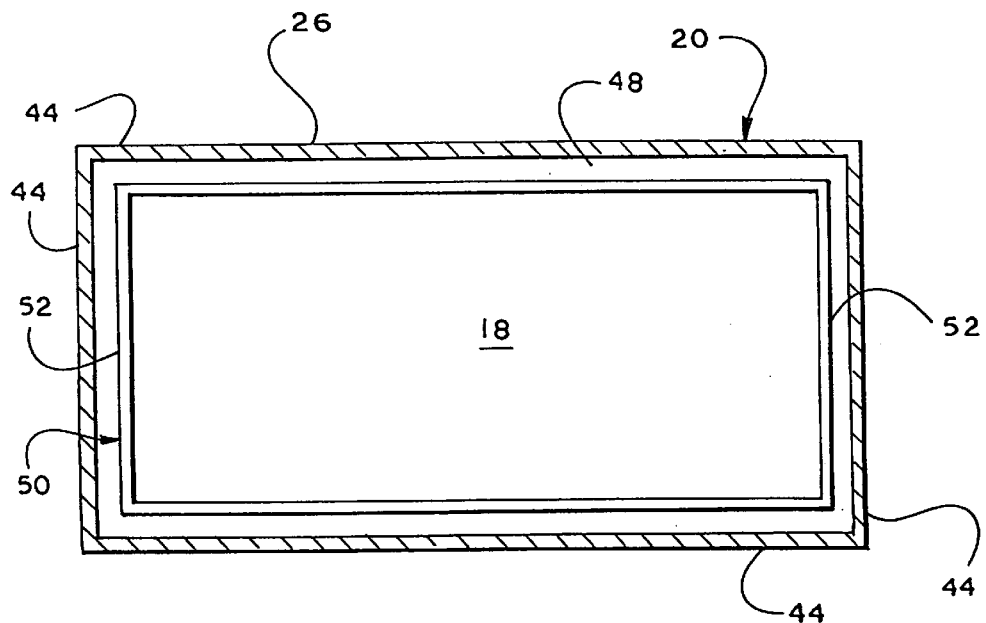
Fig_3

MEMBRANE FOR SELECTIVE TRANSPORT OF OXYGEN OVER WATER VAPOR AND METAL-AIR ELECTROCHEMICAL CELL INCLUDING SAID MEMBRANE

TECHNICAL FIELD

This invention relates to membranes which are selectively permeable to certain gases, and more particularly to a membrane which is more permeable to oxygen than water vapor. This invention also relates to metal-air electrochemical cells and control of the water content in metal-air cells.

BACKGROUND OF THE INVENTION

Metal-air electrochemical cells utilize oxygen from ambient air as a reactant in an electrochemical reaction to provide a relatively lightweight power supply. Generally described, a metal-air cell includes an air-permeable cathode and a metallic anode separated by an aqueous electrolyte. During operation of a zinc-air cell, for example, oxygen from the ambient air is converted at the cathode to hydroxide ions, zinc is oxidized at the anode and reacts with hydroxide ions, and water and electrons are released to provide electrical energy.

Cells that are useful for only a single discharge cycle are called primary cells, and cells that are rechargeable and useful for multiple discharge cycles are called secondary cells. An electrically rechargeable metal-air cell is recharged by applying voltage between the anode and the cathode of the cell and reversing the electrochemical reaction. During recharging, the cell discharges oxygen to the atmosphere through the air-permeable cathode and the anode is electrolytically reformed by reducing to the base metal, the metal oxides formed during discharge.

One problem with metal-air cells is that the difference between the ambient relative humidity and the internal relative humidity of the cell can cause the metal-air cell to fail. If ambient humidity is greater than the equilibrium relative humidity value for the metal-air cell, the metal-air cell will absorb water from the air through the cathode and fail due to a condition called flooding. Flooding may cause the cell to leak. If the ambient humidity is less than the equilibrium relative humidity value for the metal-air cell, the cell will release water vapor from the electrolyte through the air cathode and fail due to drying out. In most environments where a metal-air battery cell is used, failure occurs from drying out.

Drying out and flooding are greater problems for secondary (rechargeable) metal-air cells than for primary metal-air cells. Although ambient humidity may not be a sufficient problem to flood or dry out a cell after a single cycle, cumulative water gain or loss from a series of discharge and charge cycles can cause premature failure of a secondary metal-air cell.

Thus, it has been desirable to control the exposure of the air cathode in a metal-air cell to air so that the amount of oxygen supplied to the cathode is sufficient to generate the power demands of the cell, but the amount of air to which the cathode is exposed is insufficient to cause premature failure of the cell through flooding or drying out. To control the exposure of the air cathode in a metal-air cell to air, cell case structures and air management systems have been developed to limit the air exposure of the air cathode to air.

One approach to controlling the water vapor content of a metal-air cell is through the use of an air manager system. In an air manger system, a fan supplies air through a system of sized openings and plenums in a housing containing an array of metal-air cells. The exposure of the air cathode of the cell to air is controlled by the rate of delivery of air by the fan and the size of the plenums and the openings in the housing. Such arrangements have been effective to control the water content of metal-air cells; however, they are relatively costly to produce because of the necessity of air-tight seals and appropriate part tolerances to deliver the appropriate amount of air to the cells.

Another method for controlling the amount of water vapor in a metal-air cell is with a membrane such as a thin layer of microporous material disposed adjacent an air cathode. The pores in the membrane control the exposure of the air cathode to air to limit the flow of water vapor in and out of the cell.

Still another article for controlling the water content of a metal-air cell is a perforated mask covering the air cathode and forming an air plenum adjacent the air cathode. The openings in the mask are sized and distributed across the mask so as to allow a sufficient amount of air to the air cathode for an adequate production of power from the cell, but limit the amount of air to which the air cathode is exposed so as to prevent premature failure of the cell from flooding, drying out, or contamination. Although such arrangements are effective to control the water vapor content of the cell to some extent, greater control is desirable.

Accordingly, there is a need for a metal-air cell with enhanced control over the water content of the cell.

SUMMARY OF THE INVENTION

This invention solves the above-described problems in the art by providing a permeable membrane for selective transport of oxygen over water vapor. The membrane comprises a gas permeable substrate film and a layer of a polymeric perfluoro compound on the substrate. The polymeric perfluoro compound has oxygen covalently bonded to the polymer backbone and, more particularly, has a polyether backbone. The membrane is more permeable to oxygen than water vapor. Oxygen is passed through the membrane because the oxygen dissolves in the polymeric perfluoro compound and passes through to the other side of the membrane. The water vapor, on the other hand, is dissolved to a lesser extent in the polymeric perfluoro compound, and thus passes through the membrane at a much lower rate. The polymeric perfluoro compound is hydrophobic.

The present invention also encompasses a metal-air cell including the above-described selectively permeable membrane. The metal-air cell includes a case having a cathode opening for receiving gas into and releasing gas from the case, an air cathode disposed in the case adjacent the cathode opening, an anode disposed in the case, an aqueous electrolyte disposed in the case and contacting the air cathode and the anode, and the selectively gas permeable membrane. The selectively gas permeable membrane is positioned relative to the cathode opening so that gas received into and released from the case through the cathode opening passes through the selectively gas permeable membrane to the air cathode. The selectively gas permeable membrane allows enough oxygen from the ambient air to permeate to the air cathode and power the cell, but limits passage of water vapor through the membrane so that the rate of water vapor released from the cell or received into the cell is limited. As a result, the metal-air cell is less likely to fail from drying out or flooding and has enhanced cycle life.

The perfluoro compound is desirably a perfluoropolyalkylene oxide. A suitable perfluoropolyalkylene oxide, for example, is polyperfluoropropylene oxide co-perfluoroformaldehyde. According to a particular embodiment of the invention, the perfluoro compound is crosslinked on the substrate film so that the layer of perfluoro compound can be made very thin such as from 0.01 to 10 microns. When not crosslinked, the perfluoro compound layer desirably has a thickness from about 1.0 to about 25 microns. According to still another embodiment of this invention, the selectively gas permeable membrane can be a monolayer of a perfluoro compound covalently bonded to the substrate film. According to still another embodiment of this invention, the selectively gas permeable membrane can be self-supporting (without the substrate film) when crosslinked.

The gas permeable substrate film is desirably an oxygen permeable substrate and more desirably a porous polymer membrane having a pore size less than about 5 microns. The porous polymer membrane suitably has a plurality of pores which are filled with the polymeric perfluoro compound. Suitable porous polymer membranes include microporous membranes, which have pore sizes from 0.1 to 1.0 micron, and ultrafiltration membranes which have even smaller pore sizes. A suitable microporous polymer membrane is a microporous polyolefin membrane such as a microporous polypropylene membrane. Another suitable porous polymer membrane is a polyether sulfone asymmetric ultrafiltration membrane. Desirably, the entire selectively gas permeable membrane including the substrate and the polymeric perfluoro compound has a thickness less than 0.25 mm.

Accordingly, an object of the present invention is to provide a membrane which selectively transports oxygen over water vapor.

Another object of the present invention is to provide a metal-air electrochemical cell with enhanced control over water content.

Still another object of the present invention is to provide a metal-air electrochemical cell with enhanced cycle life.

Other objects, features, and advantages of the present invention will become apparent from the following detailed description, drawings, and claims.

BRIEF DESCRIPTION OF DRAWINGS

FIG. 1 is a perspective view of a metal-air cell made in accordance with an embodiment of the present invention.

FIG. 2 is a partial, cross-sectional, elevation view of the metal-air cell shown in FIG. 1.

FIG. 3 is a plan view of a portion of the case of the metal-air cell shown in FIG. 1 illustrating a selectively permeable membrane.

DETAILED DESCRIPTION OF DRAWINGS

As summarized above, the present invention encompasses a permeable membrane which comprises a layer of a polymeric perfluoro compound and exhibits selective transport of oxygen over water vapor. The invention also encompasses a metal-air electrochemical cell comprising such a membrane so that the cell has enhanced control over its water content. Embodiments of this invention are described in detail below.

A metal-air cell 10 is shown in FIGS. 1 and 2 and generally comprises an anode 12, an air cathode 14, a separator 16, an electrolyte, and a selectively permeable first membrane 18 disposed in a cell case 20. In FIG. 1, the cell 10 is oriented so that the cathode 14 is above the anode 12. In FIG. 2, the cell 10 is inverted so that the anode 12 is above the cathode 14. During normal operation, the cell is desirably oriented so that the anode 12 is above the cathode 14.

Desirably, the metal-air electrochemical cell 10 is a rechargeable cell and has two modes of operation. The first mode is the discharge mode in which oxygen is consumed at the air cathode 14 and electricity is produced. The second mode is the recharge mode in which oxygen in produced at the cathode 14 and released from the cell 10 and electrical energy is stored.

The anode 12 can be any anode suitable for use in a metal-air electrochemical cell. Generally described, the anode 12 comprises an anodic material bonded to a metal current collector. A suitable anode is disclosed in U.S. Pat. No. 5,506,067, the disclosure of which is expressly incorporated herein by reference.

Generally described, the anodic layer of the anode 12 is desirably a sheet of solid, non-particulate metal that oxidizes under conditions of operation of an electrochemical cell to produce electrical energy. Suitable metals include zinc, aluminum, magnesium, lithium, iron, cadmium, and lead. The current collector includes a metal which is capable of conducting electricity produced during discharge of the cell, but not being oxidized during discharge of the cell. Suitable metals for the current collector are non-corrosive metals such as copper, nickel, tin, titanium, or silver. The current collector is desirably a silver foil. As shown in FIG. 1, the current collector of the anode 12 has a lead 22 which extends from the cell case 20 for electrical connection to a load.

The cathode 14 can be a cathode suitable for use in a metal-air electrochemical cell, but is desirably a porous sheet-type cathode including an active layer directly adhered to a gas-permeable, liquid-impermeable, wet proofing layer, as disclosed in U.S. Pat. Nos. 3,977,901, 5,306,579, and 5,506,067, the disclosures of which are expressly incorporated herein by reference. Generally described, however, the active layer of the cathode 14 forms the electrolyte side of the cathode, faces the electrolyte, and comprises catalyzed particles of activated carbon and particles of a hydrophobic polymer such as polytetrafluoroethylene. The wet proofing layer forms the air side of the cathode 14 and includes a mixture of carbon black particles and polytetrafluoroethylene particles. The cathode 14 further includes a metal current collector which has a lead 23 extending therefrom for connection to a positive terminal for the cell 10. Suitable current collectors include fine mesh metal screens and expanded, perforated metal sheets made of non-corrosive metal such as nickel, tin or titanium.

A suitable electrolyte is an aqueous electrolyte including a Group I metal hydroxide such as LiOH, NaOH, KOH, CsOH, or the like.

The separator 16 disposed in the cell case 20 between the anode 12 and the cathode 14 separates the anode and cathode of the cell so that the electrodes do not come in direct electrical contact with one another and short circuit the cell. The separator 16 also absorbs and wicks electrolyte to keep electrolyte in contact with the electrodes. A suitable separator system is disclosed in U.S. Pat. No. 5,506,067, already incorporated by reference. Generally described, the separator 16 includes a plurality of layers of wettable and oxidation-resistant material such as nonwoven polymeric webs. The separator 16 allows the flow of electrolyte, but at least one layer of the separator retains the metallic ions and compounds from the anode 12 at the anode and separate from the other components of the metal-air cell.

The cell case 20 comprises a rectangular, boxed-shaped or prismatic shell 24. The shell 24 comprises a substantially rectangular first member 25 and a substantially rectangular second member 26, both having the shape of a tray. The first member 25 is heat welded to the second member 26 along a single seam 28 to form the prismatic shape. The anode 12 is disposed proximate the first member 25 and the cathode 14 is disposed proximate the second member 26. Desirably, the case 20 is made of a material, such as polypropylene, that is lightweight and does not corrode when exposed to the electrolyte.

The first member 25 of the case shell 24 comprises a planar, rectangular anode panel 30 and four side walls 32 extending perpendicularly from the anode panel along the edges of the anode panel. As best shown in FIG. 2, the first member 25 of the case shell 24 further includes a plurality of spacers 34 integral with and extending inwardly from the first member 25 of the case 20 about the periphery of the anode panel 30. The spacers 34 are spaced from one another and space the anode 12 of the cell 10 from the first member 25.

The anode panel 30 of the first member 25 has one or more gas vents 36 for releasing gas from the cell case 18. A suitable vent 36 is disclosed in U.S. Pat. No. 5,362,577, which is expressly incorporated herein by reference.

A rectangular support 38 fits about the interior of the cell case 20. The separator 16 and the cathode 14 extend within the rectangular support 38. A second gas permeable membrane 40 fits tightly between the cell case 20 and the rectangular support 38. The second membrane 40 is a gas-permeable, liquid-impermeable membrane, but does not include a polymeric perfluoro compound which forms part of the first gas permeable membrane 18. This second membrane 40 extends across the air side of the cathode 14 and allows passage of air to and from the cathode, but seals electrolyte within the cell case 20. A suitable material for the second membrane 40 is pipetape grade Teflon available from Furon Division of New Haven, Conn.

The second member 26 of the case shell 24 comprises a rectangular cathode panel 42 and four side walls 44 extending perpendicularly from edges of the cathode panel. The cathode panel 42 optionally includes a mask member 46 which extends over and is spaced from the air cathode 14. The second member 26 of the case 20 has a first peripheral shoulder 48 surrounding the mask member 46 and defining an opening 50 for receiving and releasing gas from the cell case 20 through the cathode 14. The second member 26 of the case 20 also includes a second peripheral shoulder 52 inward of the first peripheral shoulder 48 and spaced from the cathode 14 for mounting the first selectively gas permeable membrane 18 which selectively transports the first peripheral shoulder 48 and spaced from the cathode 14 for mounting the first selectively gas permeable membrane 18 which selectively transports oxygen over water vapor. The mask member 46 and the remainder of the second member 26 of the case 20 form a housing defining an air plenum 54 adjacent the cathode 14. The first gas permeable membrane 18 separates the air plenum 54 into two portions, one portion adjacent the cathode 14 and another portion adjacent the mask 46.

The mask member 46 allows air into the air plenum 54 which supplies oxygen to the cathode 14 through the first gas permeable membrane 18 and the cathode opening 50 in the case. The mask member 46 allows enough air in the plenum 54 for adequate power production from the cell, but, along with the first gas permeable membrane 18, limits the exposure of the air cathode to air to minimize exposure of the air cathode to moisture and contaminates to prevent premature failure from flooding, drying out, or contamination. A suitable mask member is disclosed in U.S. Pat. No. 5,328,777, the disclosure of which is expressly incorporated herein by reference. Although, the mask 46 aids in controlling the exposure of the cathode 14 to water vapor, the mask is optional and can be eliminated so that the first membrane 18 forms the outermost cover over the cathode.

The first gas permeable membrane 18 is a thin, rectangular sheet comprising a polymeric perfluoro compound and is more permeable to oxygen than water vapor. This is because oxygen is more soluble in the polymeric perfluoro compound than water vapor. Oxygen, driven by its partial pressure, dissolves in the polymeric perfluoro compound and passes through the membrane from one side to the other.

The first gas permeable membrane 18 is disposed in the cell case 20 in the second member 26 of the case. The first gas permeable membrane 18 is rectangular and is hot-melt glued, or otherwise adhered, to the second peripheral shoulder 52 of the second member 26 so as to extend completely over the cathode 14 and the cathode opening 50 so that any gas entering or exiting the cell 10 through the cathode must pass through the first membrane. Because the first gas permeable membrane 18 hinders the passage of water vapor, the first gas permeable membrane holds water vapor in the cell 10 so that the cell does not dry out and prevents water vapor from entering the cell to prevent the cell from flooding. Accordingly, the first membrane 18 enhances the cycle life of the cell.

According to a first embodiment, the first gas permeable membrane 18 comprises a liquid polymeric perfluoro compound on a microporous polymer substrate and is therefore called a supported liquid membrane. The liquid polymeric perfluoro compound of the first embodiment is not crosslinked. According to a second embodiment, however, the first gas permeable membrane 18 comprises a crosslinked polymeric perfluoro compound on a porous polymer ultrafiltration membrane substrate. Because the perfluoro compound is crosslinked, the layer of perfluoro compound in this second embodiment can be made very thin so that it allows oxygen to permeate therethrough at a greater rate than the thicker, uncrosslinked perfluoro compound layer of the first embodiment. According to still a third embodiment, the first gas permeable membrane includes a monolayer of perfluoro compound covalently bonded to a porous polymer ultrafiltration membrane substrate. The monolayer of perfluoro compound in this third embodiment is also very thin. According to yet a fourth embodiment, the selectively permeable membrane only includes a layer of crosslinked polymeric perfluoro compound and does not include a substrate. This fourth embodiment avoids the microporous and ultrafiltration substrates which can be relatively expensive. These four embodiments are explained in more detail as follows.

Suitable substrates for the first embodiment of the selectively permeable membrane 18 are oxygen permeable and have a pore size less than 5 microns. Particularly suitable substrates include porous polyolefin nonwoven membranes such as microporous polyethylene or polypropylene membranes and polymeric ultrafiltration membranes. A microporous membrane has a pore size within the range from about 0.1 to about 1.0 micron and ultrafiltration membranes have a pore size less than 0.1 micron. Suitable polymeric nonwoven materials include Celgard 2400 or 2500 microporous polypropylene membranes available from Hoechst Celanese Corporation of Charlotte, N.C. Desirably, the pores in the membrane are filled with the polymeric perfluoro compound such as by dipping the membrane in a solution containing the polymeric perfluoro compound. The solution can also be applied by other means such as spraying, roll coating, vacuum coating or thermal or plasma deposition.

Suitable polymeric perfluoro compounds for the first embodiment of the selectively permeable membrane 18 have oxygen covalently bonded in the polymer backbone and include perfluoropolyalkylene oxides. In particular, polyperfluoro-propylene oxide co-perfluoroformaldehyde having a molecular weight of 6600 is a suitable perfluoropolyalkylene oxide and is available from Aldrich Chemical Company of Milwaukee, Wis. Other suitable polymeric perfluoro compounds include polyperfluoro-propylene oxide, polyperfluoro-ethylene oxide, polyperfluorooxy tetramethylene, and copolymers thereof with perfluoro compounds. Particularly suitable commercially available perfluoro compounds include polyhexafluoropropylene oxide available from Scientific Polymer Products of Ontario, N.Y. and numbers 1514, 1618, and 16256 KRYTOX perfluoro alkyl ether available from Dupont of Wilmington, Del.

The total thickness of the first gas permeable membrane 18 made according to the first embodiment is less than 0.25 mm and the thickness of the polymeric perfluoro compound layer is less than 25 microns so that the membrane allows oxygen to permeate therethrough at a rate sufficient to support electrical discharge of the cell 10 and at a rate sufficient to release oxygen from the cell during recharge. Desirably, the thickness of the polymeric perfluoro compound layer is within a range between 1.0 and 25 microns.

Selectively permeable membranes made in accordance with the above described embodiments were tested to measure the permeance of oxygen and water vapor through the membranes by exposing one side of each membrane, referred to as the feed side, to a humid air stream of known composition, and monitoring the rate at which the gases permeate the membranes to the opposite side, referred to as the permeate side. The rate at which a gas permeates the membrane is referred to as the permeance of the gas. The permeances of oxygen and water vapor through the membrane are normalized to the partial pressure driving force of each gas and to the area of the membrane. The selectivities of the membranes were then calculated by taking the ratio of the oxygen permeance to the water vapor permeance. The selectively permeable membranes made in accordance with the first embodiment described above exhibited an oxygen permeance of at least $1 \times 10^{-7}$ cm$^3$cm$^{-2}$s$^{-1}$cmHg$^{-1}$ and oxygen/water vapor selectivities of greater than one. The majority of membranes made according to the first embodiment exhibited oxygen/water vapor selectivities between three and five.

Although the first embodiment of the selectively permeable membrane 18 is selectively permeable to oxygen over water vapor, in some applications, a greater permeability of oxygen is needed. This can be achieved with a thinner layer of polymeric perfluoro compound, but a layer of liquid polymeric perfluoro compound may develop defects or holes when too thin. Accordingly, the second embodiment of the selectively permeable membrane 18 includes a layer of crosslinked polymeric perfluoro compound on a microporous polymer substrate. Because the perfluoro compound is crosslinked, or cured, the layer of perfluoro compound is solid and more durable and can be made very thin without any defects such as holes.

The total thickness of the second gas permeable membrane 18 made according to the second embodiment is less than 0.25 mm and the thickness of the polymeric perfluoro compound layer is within a range between 0.01 and 10 microns. Desirably, the thickness of the polymeric perfluoro compound layer in the second embodiment is within a range between 0.05 and 5 microns.

Suitable substrates for the second embodiment of the selectively permeable membrane includes those suitable for the first embodiment. A particularly suitable substrate for the second embodiment is a polyether sulfone asymmetric ultrafiltration membrane.

Suitable polymeric perfluoro compounds for the second embodiment include polymeric perfluoro prepolymers with polymerizable end groups so that the perfluoro compound can be cured on the substrate film to crosslink the prepolymer and immobilize the perfluoro compound on the substrate. The polymeric perfluoro prepolymer desirably comprises a perfluoroalkylene oxide with polymerizable end groups. Suitable end groups for crosslinking include hydroxyl, carboxyl, carboxoyl chloride, amine, acrylate, methacrylate, vinyl, or ester functional groups. Polymeric perfluoro compounds with crosslinkable end groups are described as end capped and can be cured to crosslink the polymer by methods such as ultraviolet radiation or electron beam curing in the presence of a photoinitiator, thermal curing, or interfacial polymerization.

An example of effective end capped perfluoro prepolymers for making the second embodiment include poly(perfluoroalkyl)ether diacrylates or dimethacrylates having the following formula A:

$CH_2C(R)C(O)O((CF_2)_nO)_mC(O)C(R')CH_2$ wherein R and R' can independently vary between H or $CH_3$, the subscript n can vary between 1 and 5, and the subscript m can vary such that the molecular weight of the perfluorinated portion varies between 500 and 50,000.

Another example of effective end capped perfluoro prepolymers for making the second embodiment include poly(perfluoroalkyl)ether diacrylates or dimethacrylates having the following formula B:

$CH_2C(R_1)C(O)O(CF_2CF(R_2)O)_nC(O)C(R')CH_2$ wherein $R_1$ and R' can independently vary between H or $CH_3$, $R_2$ can be H, $CH_3$, or $CF_3$, the subscript n can vary such that the molecular weight of the perfluorinated portion varies between 500 and 50,000.

Still other examples of effective end capped perfluoro prepolymers for making the second embodiment include:

a. FLUOROLINK C perfluoropolyether carboxylic acid available from the Ausimont division of the Montedison Group in Morristown, N.J., having formula HOOC—$CF_2$O$(CF_2CF_2O)_m(CF_2O)_nCF_2$—COOH;

b. FLUOROLINK T hydroxyperfluoropolyether available from the Ausimont division of the Montedison Group having the formula HOCH$_2$CH(OH)CH$_2$OCH$_2$CF$_2$O(CF$_2$CF$_2$O)$_m$(CF$_2$O)$_n$C F$_2$CH$_2$OCH$_2$CH(OH)CH$_2$OH;

c. KRYTOX 157FSL perfluoropolyether monocarboxylic acid available from Dupont;

d. FOMBLIN MF 300 available from Ausimont; and e. FOMBLIN MF 407 available from Ausimont.

The second embodiment of the selectively permeable membrane 18 is made by applying the perfluoro prepolymer, which is liquid, to the microporous substrate such as by dipping or spraying and then curing the prepolymer on the substrate to crosslink the prepolymer. Desirably the pores of the substrate are filled with the prepolymer prior to the curing step. The polymer can be cured by irradiation with ultraviolet radiation if an ultraviolet photoinitiator such as benzophenone is added to the prepolymer. The prepolymer can also be cured by treating the coated substrate with an electron beam. Alternatively, other curing means such as thermal curing can also be used. A particularly desirable method of curing the prepolymer on the substrate, however, is interfacial curing which involves immersing the prepolymer coated membrane in a solution including a curing agent and a solvent which is immiscible with the prepolymer to cure the prepolymer, removing the coated substrate from the curing solution, washing the membrane with additional solvent, and then removing any remaining liquid (uncured) prepolymer from the membrane with an appropriate solvent such as acetone, N-methyl pyrrolidone, and Perfluorosolv, available from Ausimont. The resulting membrane has a very thin layer of solid perfluoro polymer on the substrate.

Suitable immiscible solvents for use in the interfacial polymerization include heptane and hexane and suitable curing agents include toluene diisocyanate, trimesoyl trichloride, n-butyl trichloro silane, n-butyl trimethoxy silane, di-n-butyl dichloro silane, and sebacoyl dichloride.

In the third embodiment of the invention, a very thin monolayer layer of polymeric perfluoro compound is covalantly attached to the surface of a membrane with very small pores. In so doing, it is possible to form a network of overlapping polymeric perfluoro compounds and thus form a continuous network of the polymer. When covalently bonded to a membrane having sufficiently small pores, the polymeric perfluoro compound attaches to the surface of the small pore walls and overlaps. However, if the pores are too large, the monolayer of polymeric perfluoro compound will not overlap and there will not be a continuous network of the polymer. A continuous network of the polymeric perfluoro compound is necessary to impart the required oxygen over water vapor selectivity of the polymeric perfluoro compound to the membrane.

Suitable substrates for covalent attachment of the polymeric perfluoro compound include a wide variety of asymmetric ultrafiltration membranes. A particularly suitable substrate is a polyether sulfone asymmetric ultrafiltration membrane that has been rendered hydrophilic by inclusion of a hydroxyl-bearing polymer (such as polysaccharide) in the membrane casting solution. Inclusion of this hydroxyl-bearing polymer in the membrane not only makes the membrane hydrophilic, but it also provides a readily accessible and reactive moiety (i.e., the hydroxyl group) for further attachment of the polymeric perfluoro compound.

Suitable polymeric perfluoro compounds for this embodiment include polymeric perfluoro compounds with one reactive end group, so that the compound can be covalently attached to the reactive group on the membrane. The polymeric perfluoro compound desirably comprises a perfluoroalkylene oxide with one reactive end group. Suitable reactive end groups include hdyroxyl, carboxyl, carboxoyl chloride, amine, acrylate, methacrylate, vinyl, or ester functional groups.

Suitable monofunctional end-capped perfluoroalkylene oxides for making membranes by this third embodiment include Krytox 157 FSL, Krytox 157 FSM, and Krytox 157 FSH available from Dupont and which are all monocarboxyl terminated perfluoro alkyl ether compounds, with average molecular weights of 2500, 5000, and 7500, respectively.

The fourth embodiment of the selectively permeable membrane 18 is made without a substrate, but is made using the same perfluoro prepolymers as used to make the second embodiment. The perfluoro prepolymer is mixed with an ultraviolet photoinitiator such as benzophenone and a thin coating of the prepolymer mixture is applied to a forming surface, such as a glass plate, and then cured by exposing the layer to ultraviolet radiation. Alternatively, the layer of prepolymer can be cured by treatment with an electron beam. The cured layer forms a solid membrane which can be removed from the forming surface and incorporated into a metal-air cell. The self-supporting membrane can also include a plasticizer to enhance the flexibility of the cured membrane. Perfluoropolyalkylene oxide polymers, such as poly(perfluoropropylene oxide)-co-poly (perfluoroformaldehyde), are suitable plasticizers, and can be added to the prepolymer mixture in an amount up to about 50% by weight of the prepolymer. Desirably, the thickness of the self-supporting polymeric perfluoro membrane of the fourth embodiment is within a range between 0.05 and 5.0 microns. The thickness of the self-supporting membrane can be varied by adjusting the concentration of the prepolymer in the solvent used to make the membrane.

The following examples are designed to disclose particular embodiments of the present invention and teach one of ordinary skill in the art to carry out the present invention.

EXAMPLE 1

A selectively permeable membrane was made according to the first embodiment. A CELGARD 2500 membrane, available from Hoechst Celanese Corporation of Charlotte, N.C., was cut into three samples and each sample was contacted separately at 35° C. with liquid polyperfluoropropylene oxide co-perfluoroformaldehyde (PFPO) having molecular weights, MW 6600, 3200, and 1500, respectively, thereby wetting the membrane samples. The three samples were placed in a vessel and the vessel was evacuated to 10 mmHg. This process removes residual air from the pores of the membrane and allows them to be filled with the liquid polymer. The membrane samples were removed from the vessel and blotted with a cloth to remove excess liquid polymer.

The membrane samples containing the liquid polymers of differing molecular weights were tested for their permeability to oxygen, nitrogen and water vapor by passing water vapor containing air along the feed surface of the membrane samples and measuring the concentrations of oxygen, nitrogen, and water vapor in the feed stream entering the samples and the permeate streams exiting the samples. Standard gas chromatographic techniques were used to measure the concentrations of gases in both the feed and permeate streams.

Specifically, membrane samples (two inch circular disks) were placed in a permeation test cell, supported by a stainless steel screen. The cell was O-ring sealed and placed in a test apparatus at 50° C. Humid air at a fixed pressure, flow rate, and known composition of oxygen, nitrogen, and water vapor, was flowed across the membrane surface through ports on the feed side of the cell. The gases selectively permeated through the membrane, and were transported with a helium sweep stream to the gas chromatograph for analysis. The permeances of oxygen, nitrogen, and water vapor were calculated based on the concentrations of gases and pressures in both the feed and permeate streams. Selectivities for gas pairs are expressed as a ratio of the individual permeances. Results are shown in Table 1 wherein Permeance (P) has units of $cm^3 cm^{-2} s^{-1} cmHg^{-1}$.

TABLE 1

| Membrane | Feed Pressure (psig) | Permeance P(H$_2$O) | Permeance P(O$_2$) | Permeance P(N$_2$) | Selectivity O$_2$/H$_2$O | Selectivity O$_2$/N$_2$ |
|---|---|---|---|---|---|---|
| PFPO (MW 6600) in Celgard 2500 | 40 | $1.3 \times 10^{-7}$ | $5.1 \times 10^{-7}$ | $3.7 \times 10^{-7}$ | 3.9 | 1.4 |
| PFPO (MW 3200) in Celgard 2500 | 40 | $3.4 \times 10^{-7}$ | $9.5 \times 10^{-7}$ | $6.8 \times 10^{-7}$ | 2.8 | 1.4 |
| PFPO (MW 1500) in Celgard 2500 | 40 | $2.8 \times 10^{-7}$ | $8.6 \times 10^{-7}$ | $5.2 \times 10^{-7}$ | 3.1 | 1.6 |
| Celgard 2500 | 40 | $1.3 \times 10^{-2}$ | $1.3 \times 10^{-2}$ | $1.3 \times 10^{-2}$ | 1.0 | 1.0 |

EXAMPLE 2

A selectively permeable membrane is made according to the second embodiment. One ml of FLUOROLINK T perfluoro prepolymer is spread across a 30 cm$^2$ Memtec asymmetric polysulfone 100,000 molecular weight cutoff ultrafiltration membrane until the membrane becomes translucent. The wetted membrane is placed on a glass plate under a glass vacuum bell jar and a vacuum is pulled on the bell jar for 60 minutes to pull all air out of the pores of the membrane and replace the air with FLUOROLINK T liquid. The FLUOROLINK T wetted membrane is immersed in a 10% by weight solution of toluene diisocyanate curing agent in heptane for 60 minutes at room temperature to cure the prepolymer. The cured membrane is removed from the curing solution, washed with heptane, and then with acetone to remove any remaining uncured prepolymer. The resulting membrane includes a very thin layer of solid perfluoro polymer and is selectively permeable to oxygen over water vapor.

EXAMPLE 3

A selectively permeable membrane is made according to this third embodiment by reacting Krytox 157 FSH with thionyl chloride to make the reactive acid chloride derivative of Krytox 157 FSH. One ml of this reactive acid chloride derivative is spread across a 30 cm$^2$ hydroxyl-bearing hydrophilic asymmetric polysulfone 10,000 molecular weight cutoff ultrafiltration membrane until the membrane becomes translucent. The wetted membrane is placed on a glass plate under a glass vacuum bell jar and a vacuum is pulled on the bell jar for 60 minutes to pull all air out of the pores of the membrane and replace the air with the acid chloride of Krytox 157 FSH. The wetted membrane is then placed in a vacuum oven that is held at 80° C. and low vacuum for 2 hours. The reacted membrane is then removed, washed with Perfluorosolv solvent, and then with acetone to remove any remaining unreacted polymeric perfluoro compound. The resulting membrane includes a monolayer of polymeric perfluoro compound covalently attached to the pore-wall surfaces of an ultrafiltration membrane and is selectively permeable to oxygen over water vapor.

EXAMPLE 4

A selectively permeable membrane is made according to the fourth embodiment. One ml of polyperfluoropropyleneoxide dimethacrylate is dissolved in a solution containing 8.9 ml of Perfluorosolv solvent available from Ausimont, and 0.1 g of Benzophenone available from Aldrich, as a free-radical photoinitiator. A film of the solution is cast on a glass plate using a casting knife. The glass plate is pretreated with Fluoroglide spray available from Norton Co. of Newton, Mass., as a film release agent. The film is then cured by exposure to UV light, from a mercury arc lamp (100 W) for 20 minutes. The cured membrane is washed with Perfluorosolv to remove any uncured prepolymer, followed by washing with acetone to remove any unreacted benzophenone. The membrane is carefully removed from the glass and is selectively permeable to oxygen over water vapor.

Although the cell 10 described above has one cathode 14 and one anode 12, the selectively permeable membrane can also be used in a dual electrode metal-air cell as is disclosed in U.S. Pat. No. 5,569,551, the disclosure of which is expressly incorporated herein in its entirety. The metal-air cell disclosed in U.S. Pat. No. 5,569,551 includes a pair of air cathodes disposed in a cell case, and an anode comprising a single current collector sandwiched between a pair of anodic plates, such as zinc plates, and disposed in the cell case between the two cathodes. The air cathodes are spaced from respective sides of the anode and are separated from the anode by separator packages like the separator 16 of the cell 10 described herein. The case includes a pair of masks, one adjacent each cathode, and each mask forms a cathode plenum adjacent the respective cathode. A selectively permeable membrane, made as described above with regard to the cell 10, is disposed in each of the cathode plenums.

It should be understood that the foregoing relates to particular embodiments to the present invention, and that numerous changes may be made therein without departing from the scope of the invention as defined by the following claims.

We claim:

1. A selectively permeable membrane for selective transport of oxygen over water vapor comprising a gas permeable substrate film and a layer of a polymeric perfluoro compound on the substrate wherein the membrane has an oxygen permeance of at least $1 \times 10^{-7}$ cm$^3$cm$^{-2}$s$^{-1}$cmHg$^{-1}$ and an oxygen to water vapor permeation selectivity of at least 3.

2. A selectively permeable membrane as in claim 1 wherein the polymeric perfluoro compound has a molecular weight of at least about 500.

3. A selectively permeable membrane as in claim 1 wherein the polymeric perfluoro compound is a perfluoropolyalkylene oxide.

4. A selectively permeable membrane as in claim 1 wherein the perfluoropolyalkylene oxide is polyperfluoropropylene oxide.

5. A selectively permeable membrane for selective transport of oxygen over water vapor comprising a gas permeable substrate film and a layer of a polymeric perfluoro compound on the substrate wherein the polymeric perfluoro compound is polyperfluoropropylene oxide co-perfluoroformaldehyde.

6. A selectively permeable membrane as in claim 1 wherein the substrate film is a porous, oxygen permeable substrate having a pore size less than 5 microns.

7. A selectively permeable membrane as in claim 6 wherein the oxygen permeable substrate has a plurality of pores filled with the polymeric perfluoro compound.

8. A selectively permeable membrane as in claim 7 wherein the oxygen permeable substrate is a microporous polymer membrane.

9. A selectively permeable membrane as in claim 8 wherein the microporous polymer membrane is a microporous polyolefin membrane.

10. A selectively permeable membrane as in claim 8 wherein the microporous polymer membrane is a microporous polypropylene membrane.

11. A selectively permeable membrane as in claim 1 wherein the selectively permeable membrane has a thickness less than 0.25 mm.

12. A selectively permeable membrane as in claim 1 wherein the layer of polymeric perfluoro compound has a thickness less than 25 microns.

13. A selectively permeable membrane as in claim 12 wherein the layer of polymeric perfluoro compound has a thickness within a range between 1.0 and 25 microns.

14. A selectively permeable membrane as in claim 1 wherein the polymeric perfluoro compound is a perfluoropolyalkylene oxide, the substrate film is a microporous polymer membrane having a plurality of micropores filled with the polymeric perfluoro compound, the selectively permeable membrane has a thickness less than 0.25 mm, and the layer of polymeric perfluoro compound has a thickness less than 25 microns.

15. A selectively permeable membrane as in claim 14 wherein the polymeric perfluoro compound is polyperfluoropropylene oxide.

16. A selectively permeable membrane for the selective transport of oxygen over water vapor comprising a gas permeable substrate film and a layer of a polymeric perfluoro compound on the substrate wherein the polymeric perfluoro compound is polyperfluoropropylene oxide co-perfluoroformaldehyde, the substrate film is a microporous polymer membrane having a plurality of micropores filled with the polymeric perfluoro compound, the selectively permeable membrane has a thickness less than 0.25 mm, and the layer of polymeric perfluoro compound has a thickness less than 25 microns.

17. A selectively permeable membrane for selective transport of oxygen over water vapor comprising a gas permeable substrate film and a layer of a polymeric perfluoro compound on the substrate wherein the polymeric perfluoro compound is crosslinked.

18. A selectively permeable membrane as in claim 17 wherein the layer of polymeric perfluoro compound is made by applying to the gas permeable substrate film a coating of a polymeric perfluoro prepolymer with polymerizable end groups and curing the prepolymer on the substrate film to cross-link the prepolymer.

19. A selectively permeable membrane as in claim 18 wherein the polymeric perfluoro prepolymer comprises a perfluoroalkylene oxide.

20. A selectively permeable membrane as in claim 19 wherein the polymerizable end groups are selected from the group consisting of hydroxyl, carboxyl, carboxoyl chloride, amine, acrylate, methacrylate, vinyl, or ester functional groups.

21. A selectively permeable membrane as in claim 18 wherein the layer of polymeric perfluoro compound has a thickness within a range between 0.01 and 10 microns.

22. A selectively permeable membrane as in claim 18 wherein the layer of polymeric perfluoro compound has a thickness within a range between 0.05 and 5 microns.

23. A selectively permeable membrane as in claim 18 wherein the substrate film is a porous oxygen permeable substrate having a pore size less than about 5 microns.

24. A selectively permeable membrane as in claim 23 wherein the oxygen permeable substrate is a microporous polymer membrane.

25. A selectively permeable membrane as in claim 23 wherein the oxygen permeable substrate is a polyether sulfone asymmetric ultrafiltration membrane.

26. A selectively permeable membrane as in claim 18 wherein the polymeric perfluoro compound has a molecular weight of at least about 500.

27. A selectively permeable membrane as in claim 18 having an oxygen permeance of at least $1 \times 10^{-7}$ $cm^3 cm^{-2} s^{-1} cmHg^{-1}$ and an oxygen to water vapor permeation selectivity of at least 3.

28. A selectively permeable membrane for selective transport of oxygen over water vapor comprising a gas permeable substrate film and a layer of a polymeric perfluoro compound on the substrate wherein the polymeric perfluoro compound is covalently bonded to the substrate film.

29. A selectively permeable membrane as in claim 28 wherein the substrate film has a surface with a reactive moiety on the surface and the layer of polymeric perfluoro compound is made by applying to the gas permeable substrate film a coating of a polymeric perfluoro prepolymer with a polymerizable end group and reacting the prepolymer with the reactive moiety on the substrate film to covalently bond the prepolymer to the substrate film.

30. A selectively permeable membrane as in claim 29 wherein the polymeric perfluoro prepolymer comprises a perfluoroalkylene oxide.

31. A selectively permeable membrane as in claim 30 wherein the polymerizable end group is selected from the group consisting of hydroxyl, carboxyl, carboxoyl chloride, amine, acrylate, methacrylate, vinyl, or ester functional groups.

32. A selectively permeable membrane for selective transport of oxygen over water vapor comprising a self-supporting layer of a crosslinked polymeric perfluoro compound, the layer having a thickness within a range from 0.01 to 10 microns.

33. A selectively permeable membrane as in claim 32 wherein the layer of polymeric perfluoro compound is made by applying to a substrate a coating of a polymeric perfluoro prepolymer with polymerizable end groups, curing the prepolymer on the substrate to cross-link the prepolymer, and removing the cured polymeric perfluoro prepolymer.

34. A selectively permeable membrane as in claim 33 wherein the polymeric perfluoro prepolymer comprises a perfluoroalkylene oxide.

35. A selectively permeable membrane as in claim 34 wherein the polymerizable end groups are selected from the group consisting of hydroxyl, carboxyl, carboxoyl chloride, amine, acrylate, methacrylate, vinyl, or ester functional groups.

36. A selectively permeable membrane as in claim 32 having an oxygen permeance of at least $1 \times 10^{-7}$ $cm^3 cm^{-2} s^{-1} cmHg^{-1}$ and an oxygen to water vapor permeation selectivity of at least 3.

37. A metal-air electrochemical cell comprising:
- a case having a cathode opening for receiving gas into and releasing gas from the case;
- an air cathode disposed in the case adjacent the cathode opening;
- an anode disposed in the case;
- an aqueous electrolyte disposed in the case and contacting the air cathode and the anode; and
- a selectively permeable membrane for selective transport of oxygen over water vapor positioned relative to the cathode opening so that gas received into and released from the case through the cathode opening passes through the selectively permeable membrane, the selectively permeable membrane comprising a gas permeable substrate film and a layer of a polymeric perfluoro compound on the substrate.

38. A metal-air cell as in claim 37 further comprising a housing defining an air plenum adjacent the cathode opening for supplying air to the air cathode, the selectively permeable membrane disposed in the air plenum.

39. A metal-air cell as in claim 37 wherein the cell is rechargeable.

40. A metal-air cell as in claim 37 wherein the polymeric perfluoro compound has a molecular weight of at least about 500.

41. A metal-air cell as in claim 37 wherein the polymeric perfluoro compound is a perfluoropolyalkylene oxide.

42. A metal-air cell as in claim 41 wherein the perfluoropolyalkylene oxide is polyperfluoropropylene oxide.

43. A metal-air cell as in claim 42 wherein the perfluoropolyalkylene oxide is polyperfluoropropylene oxide co-perfluoroformaldehyde.

44. A metal-air cell as in claim 37 wherein the substrate film is a porous oxygen permeable substrate having a pore size less than 5 microns.

45. A metal-air cell as in claim 44 wherein the oxygen permeable substrate has a plurality of pores filled with the polymeric perfluoro compound.

46. A metal-air cell as in claim 45 wherein the oxygen permeable substrate is a microporous polymer membrane.

47. A metal-air cell as in claim 46 wherein the microporous polymer membrane is a microporous polyolefin membrane.

48. A metal-air cell as in claim 46 wherein the microporous polymer membrane is a microporous polypropylene membrane.

49. A metal-air cell as in claim 37 wherein the selectively permeable membrane has a thickness less than 0.25 mm.

50. A metal-air cell as in claim 37 wherein the layer of polymeric perfluoro compound has a thickness less than 25 microns.

51. A metal-air cell as in claim 50 wherein the layer of polymeric perfluoro compound has a thickness within a range between 1.0 and 25 microns.

52. A metal-air cell as in claim 37 wherein the polymeric perfluoro compound is a perfluoropolyalkylene oxide, the substrate film is a microporous polymer substrate having a plurality of micropores filled with the polymeric perfluoro compound, the selectively permeable membrane has a thickness less than 0.25 mm, and the layer of polymeric perfluoro compound has a thickness less than 25 microns.

53. A metal-air cell as in claim 52 wherein the perfluoropolyalkylene oxide is polyperfluoropropylene oxide.

54. A metal-air cell as in claim 53 wherein the perfluoropolyalkylene oxide is polyperfluoropropylene oxide co-perfluoroformaldehyde.

55. A metal-air cell as in claim 37 wherein the selectively permeable membrane has an oxygen permeance of at least $1\times10^{-7}$ $cm^3 cm^{-2} s^{-1} cmHg^{-1}$ and an oxygen to water vapor permeation selectivity of at least 3.

56. A metal-air cell as in claim 37 wherein the polymeric perfluoro compound is cross-linked.

57. A metal-air cell as in claim 56 wherein the layer of polymeric perfluoro compound is made by applying to the gas permeable substrate film a coating of a polymeric perfluoro prepolymer with polymerizable end groups and curing the prepolymer on the substrate film to cross-link the prepolymer.

58. A metal-air cell as in claim 57 wherein the polymeric perfluoro prepolymer comprises a perfluoroalkylene oxide.

59. A metal-air cell as in claim 58 wherein the polymerizable end groups are selected from the group consisting of hydroxyl, carboxyl, carboxoyl chloride, amine, acrylate, methacrylate, vinyl, or ester functional groups.

60. A metal-air cell as in claim 56 wherein the layer of polymeric perfluoro compound has a thickness within a range between 0.01 and 10 microns.

61. A metal-air cell as in claim 56 wherein the layer of polymeric perfluoro compound has a thickness within a range between 0.05 and 5 microns.

62. A metal-air cell as in claim 56 wherein the substrate film is a porous oxygen permeable substrate having a pore size less than 5 microns.

63. A metal-air cell as in claim 62 wherein the oxygen permeable substrate is a microporous polymer membrane.

64. A metal-air cell as in claim 62 wherein the oxygen permeable substrate is a polyether sulfone asymmetric ultra-filtration membrane.

65. A metal-air cell as in claim 56 wherein the polymeric perfluoro compound has a molecular weight at least about 500.

66. A metal-air cell as in claim 56 wherein the selectively permeable membrane has an oxygen permeance of at least $1\times10^{-7}$ $cm^3 cm^{-2} s^{-1} cmHg^{-1}$ and an oxygen to water vapor permeation selectivity of at least 3.

67. A metal-air cell as in claim 37 wherein the polymeric perfluoro compound is covalently bonded to the substrate film.

68. A metal-air cell as in claim 67 wherein the substrate film has a surface with a reactive moiety on the surface and the layer of polymeric perfluoro compound is made by applying to the gas permeable substrate film a coating of a polymeric perfluoro prepolymer with a polymerizable end group and reacting the prepolymer with the reactive moiety on the substrate film to covalently bond the prepolymer to the substrate film.

69. A metal-air cell as in claim 68 wherein the polymeric perfluoro prepolymer comprises a perfluoroalkylene oxide.

70. A metal-air cell as in claim 69 wherein the polymerizable end groups are selected from the group consisting of hydroxyl, carboxyl, carboxoyl chloride, amine, acrylate, methacrylate, vinyl, or ester functional groups.

71. A metal-air cell for selective transport of oxygen over water vapor comprising:
- a case having a cathode opening for receiving gas into and releasing gas from the case;
- an air cathode disposed in the case adjacent the cathode opening;
- an anode disposed in the case;
- an aqueous electrolyte disposed in the case and contacting the air cathode and the anode; and
- a selectively permeable membrane for selective transport of oxygen over water vapor positioned relative to the cathode opening so that gas received into and released from the case through the cathode opening passes through the selectively permeable membrane, the selectively permeable membrane comprising a self-supporting layer of a crosslinked polymeric perfluoro compound having a thickness within a range from 0.01 to 10.

72. A metal-air cell as in claim 71 wherein the layer of polymeric perfluoro compound is made by applying to a substrate a coating of a polymeric perfluoro prepolymer with polymerizable end groups, curing the prepolymer on the substrate to cross-link the prepolymer, and removing the cured polymeric perfluoro prepolymer.

73. A metal-air cell as in claim 71 wherein the polymeric perfluoro prepolymer comprises a perfluoroalkylene oxide.

74. A metal-air cell as in claim 72 wherein the polymerizable end groups are selected from the group consisting of hydroxyl, carboxyl, carboxoyl chloride, amine, acrylate, methacrylate, vinyl, or ester functional groups.

75. A metal-air cell as in claim 71 wherein the selectively permeable membrane has an oxygen permeance of at least $1 \times 10^{-7}$ $cm^3 cm^{-2} s^{-1} cmHg^{-1}$ and an oxygen to water vapor permeation selectivity of at least 3.

* * * * *